Dec. 5, 1939.   J. H. MOFFAT ET AL   2,181,907
PARKING DEVICE
Filed Feb. 5, 1937    5 Sheets-Sheet 2

INVENTORS
JOHN H. MOFFAT
BY CECIL H. TAYLOR
Lockwood Goldsmith & Galt
ATTORNEYS Dec. 5, 1939.    J. H. MOFFAT ET AL    2,181,907

PARKING DEVICE

Filed Feb. 5, 1937    5 Sheets-Sheet 3

INVENTORS
JOHN H. MOFFAT
BY CECIL H. TAYLOR
Lockwood Goldsmith & Galt
ATTORNEYS

Dec. 5, 1939.  J. H. MOFFAT ET AL  2,181,907

PARKING DEVICE

Filed Feb. 5, 1937  5 Sheets-Sheet 4

INVENTORS
JOHN H. MOFFAT
BY CECIL H. TAYLOR

Lockwood Goldsmith & Galt
ATTORNEYS

Dec. 5, 1939.   J. H. MOFFAT ET AL   2,181,907
PARKING DEVICE
Filed Feb. 5, 1937   5 Sheets-Sheet 5

FIG. 14.

INVENTORS
JOHN H. MOFFAT
CECIL H. TAYLOR
BY Lockwood, Goldsmith & Galt.
ATTORNEYS Patented Dec. 5, 1939

2,181,907

UNITED STATES PATENT OFFICE 2,181,907

PARKING DEVICE

John H. Moffat, Indianapolis, and Cecil H. Taylor, South Bend, Ind.

Application February 5, 1937, Serial No. 124,224

24 Claims. (Cl. 180—1)

This invention relates to a parking device for automobiles.

The chief object of the present invention is to provide means for the parking of a vehicle in a relatively short space when available, which parking space is but slightly greater than that of the overall length of the vehicle.

Parking devices of the general character before mentioned, include mechanism for elevating one or both ends of a vehicle and then moving the elevated vehicle end laterally to the right or left into a parking area or out of the same when the parking area available is sufficient to accommodate the vehicle but insufficient for the driver to park the vehicle therein by the usual methods of pulling ahead of the area and then backing into it or driving into it, as is well understood by persons operating automobiles.

The present invention is, as stated in the foregoing object, directed to a simplification of mechanism having the operative relations specified.

The chief feature of the invention consists in the provision of an intermediate wheel which may be lowered into the vehicle raising position and then may be rotated in one direction or the other for transverse movement of the vehicle into or out of the parking area when said area is of sufficient length to permit reception of the vehicle or of insufficient length to permit normal parking, as previously set forth, the aforesaid mechanism being of the fluid operable type.

Another feature of the invention is the provision of means for automatically loading the vehicle springs so as to substantially retain the vehicle wheels, which are elevated with the vehicle, in substantially the same relative position with respect to the vehicle body as the same occupy when the vehicle rests upon said wheels.

Another feature of the invention consists in the simplified form of control or the fluid power mechanisms.

When but a single form of the invention is employed, the same preferably is associated with the rear wheels which in the majority of instances, are not dirigible. If the rear wheels are dirigible, then the invention will be associated with the forward wheels, if the parking device associated with the vehicle is of singular character. The reason for that is that when the forward wheels are dirigible, the forward end of the vehicle can be driven directly into the parking area and to the extreme forward portion thereof. Then the rear wheels with the body and chassis are elevated and then the rear end of the vehicle is moved laterally into the parking area and the raising device is reversely operated which lowers the rear wheels into vehicle supporting position in the proper place in the parking area.

One feature of the invention is that all of the manually operable members for controlling the operation of the parking devices are of a remote operable character and are positioned in the driving compartment of the vehicle so as to be readily accessible to the operator thereof without requiring the operator to leave the vehicle to secure operation of the parking device.

Another feature of the invention is that the parking device is independent of the propelling system of the vehicle but is directly associated with the power plant of the vehicle.

A corollary of the foregoing is that the device in its entirety may be fabricated as an attachment and may be attached to present standard vehicles without modification of the latter to any material degree.

The full nature of the invention will be understood from the accompanying drawings and the following description and claims:

In the drawings, 10 indicates a vehicle frame, 11 a front wheel which is of dirigible character, supported by an axle 12, the latter being supported by springs 13 carried by the frame in any desired manner, the wheels being dirigibly directed or controlled by the steering wheel 14 in the driver's compartment 15 of the vehicle. The body of the vehicle is indicated generally by numeral 16 and includes the driver's compartment 15, such other compartments as may be desired rearwardly thereof, and the engine compartment 17, in which is mounted at the forward end, the usual radiator 18, if the same embodies a positive cooling system. Also positioned in this compartment is the usual power plant or engine 19 which mounts a fan 20 driven by a fan belt 21 from a pulley, not shown, but which is driven by the engine.

The frame 10 at its rear end in standard automobiles has an "upkick" portion 22 and therebeneath is an axle structure 23 with which is associated the vehicle propelling means interposed between the engine and the rear wheels 24 carried by the rear axle structure, the latter in turn being carried by the frame through the springs 25.

All of the aforesaid is merely a conventional representation of a motor vehicle, such as an automobile, to which the invention is applied.

The invention includes a pump 26 having a pulley 27 driven by the fan driving the belt 21. The pump is suitably mounted in the engine compartment as by being bolted, or the like, to the engine as at 28. Also suitably secured as at 30 to the engine is a reservoir 31. This may, if desired, be mounted on the frame of the vehicle. However, mounting on the engine insures that the fluid, preferably a liquid in a fluid system, is maintained at a fairly high temperature so that it will be free flowing. Thus, the pump 26 is continuously actuated while the engine is running.

Figures 1, 1A:
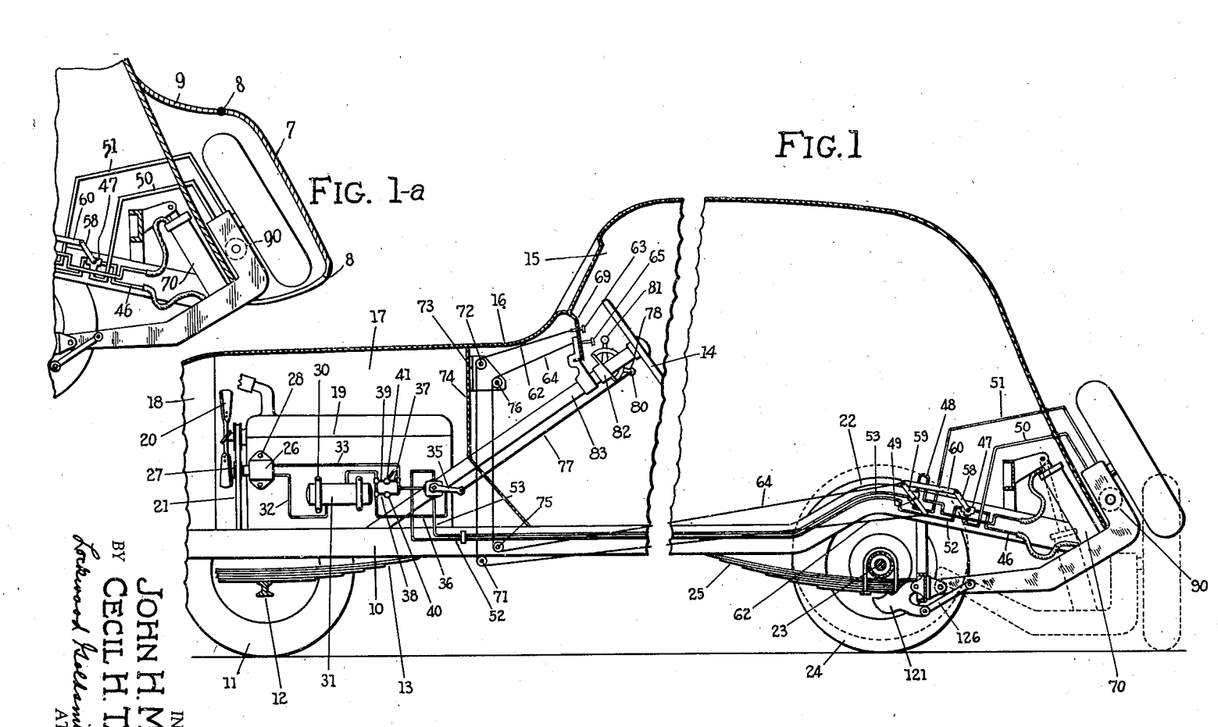
Fig. 1 is a longitudinal section of a portion of a conventional motor vehicle, certain portions thereof being omitted and certain portions thereof being shown in elevation, the invention being applied thereto and shown in elevation, while the lower dotted lines to the right indicate a second position of certain parts of the invention.
Fig. 1a illustrates a portion of vehicle shown in Fig. 1, but includes a concealment addition thereto.
Figures 2, 4, 5, 6:
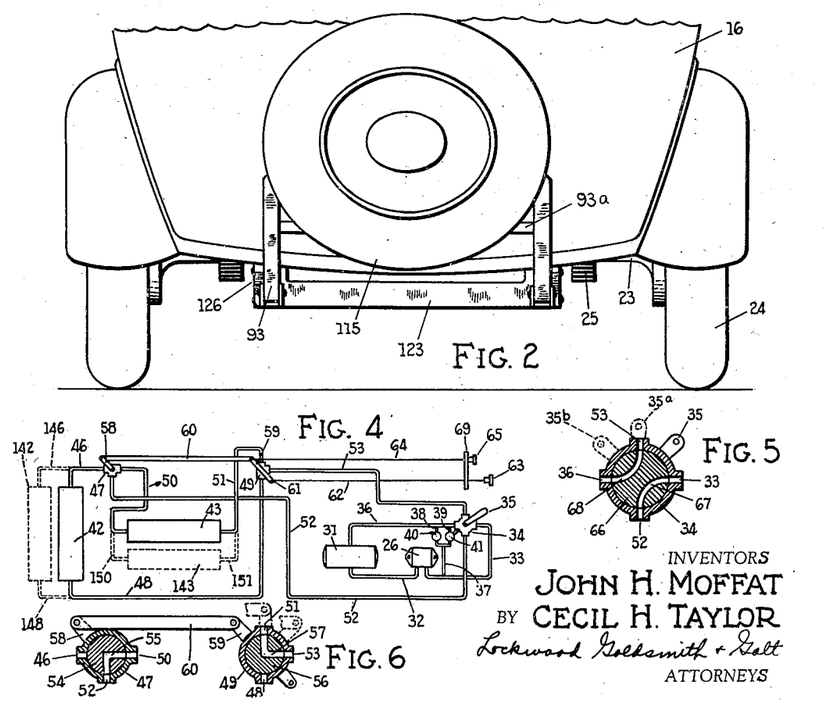
Fig. 2 is a rear elevational view of an unconcealed form of the invention in the inoperative position and showing the same associated with the rear wheels of a vehicle.
Fig. 4 is a diagrammatic representation of the fluid system embodied in the invention, together with the controls therefor.
Fig. 5 is a transverse sectional view of the four-way valve embodied in the system.
Fig. 6 is a transverse sectional view through the dual three-way valves embodied in the fluid system and the interconnection therebetween.

Reference will now be had to Figs. 4 to 6, inclusive, as well as Fig. 1, and the fluid system will now be described before proceeding to a detailed description of the fluid operable mechanisms embodied in the parking device shown herein applied to the rear wheels of the vehicle.

The pump 26 is connected to the reservoir or supply 31 by a conduit 32. The pump 26 is connected by a conduit 33 to a 4-way valve structure 34 having the operating handle 35. The 4-way valve structure has a conduit 36 connecting it to the reservoir. This constitutes the return line. Inasmuch as the pump is continuously actuated, there is provided a bypass conduit 37 which leads from the pump discharge—communicating with conduit 33—at one end and discharges to the return conduit 36. Herein conduit 37 includes the branch 38 and the branch 39.

Branch 38 includes an automatic relief valve 40 while branch 39 includes the valve 41 which is operatively associated although such association is not specifically illustrated herein with the valve handle 35 so that when valve handle 35 is positioned—see Fig. 5—in the neutral or cutoff position—not shown—but represented by the dotted lines 35a, the valve 41 will be simultaneously positioned in open relation. When thus positioned, the pump will merely circulate the liquid from the reservoir through the pump, through the bypass 37, branch 39 and thence back to the reservoir through the conduit 36.

When the valve handle 35 is positioned in either of its power applying positions, the valve 39 remains closed and if there be an excess of pressure or the engine and pump be operated beyond the range of operation, as will be more fully set forth hereinafter, of the fluid operable devices, the surplus fluid will discharge through the automatic valve control branch 38 to the return line 36.

In Fig. 4 there is shown a cylinder and piston structure arbitrarily designated as a vertical cylinder and indicated as an entirety by the numeral 42. Similarly there is illustrated a cylinder and piston construction arbitrarily designated as the horizontal cylinder and indicated as an entirety by the numeral 43. A conduit 46 extends from one end of cylinder 70 of entirety 42 to a 3-way valve 47. Another conduit 48 extends from the opposite end of cylinder 70 of entirety 42 to another 3-way valve 49. A conduit 50 extends from one end of the horizontal cylinder 90 of entirety 43 to the 3-way valve 47 and the conduit 51 extends from the opposite end of the horizontal cylinder 90 of entirety 43 to the 3-way valve 49. A conduit 52 extends from the 3-way valve 47 to the 4-way valve 34. Another conduit 53 extends from the 3-way valve 49 to the 4-way valve 34.

In Fig. 6, the several conduits associated with the 3-way valves are not illustrated but the communicating passages or ports in the valve bodies are similarly designated by the same numbers as those of said conduits.

Valve 47 includes the valve body 54 having the right angle passage 55 therein adapted to connect port 52 with port 50, as shown in Fig. 6, or port 46 with port 52, or the valve body 54 may be positioned intermediate the aforesaid positions and thus completely cut off all communication through the valve.

Similarly, valve 49 includes the port 48, port 53 and port 51 and as shown in Fig. 6, the valve body 56 in the valve 49 has the right angle passage 57 connecting port 51 with port 53. When the valve is positioned at 90° in a clockwise direction, port 48 will communicate with port 53 through the valve and port 51 will be cut off. When the valve is positioned at approximately 45° thereto, none of the ports communicates with any other port.

Valve 47 includes a handle 58 and valve 49 includes a handle 59. These handles are connected by a bar 60 which insures conjoint operation of the valves when either is operated. The handle 59 is shown extended—see Figs. 4 and 6—and to the extended end of handle 59 as at 61 is secured an operating rod 62 having a manually engageable member 63 exposed in the driver's compartment of the vehicle.

There is also connected to the opposite end of the handle 59 adjacent the connection of the member 60 thereto, a second operating member 64 having a manually operable member 65 similarly exposed in the handle compartment. The handle application in a practical embodiment of the invention is illustrated more fully in Fig. 1 and reference thereto will be had hereinafter.

The 4-way valve 34 has four ports therein which are designated with the same numerals as the conduits connected to said valve are designated. As shown in Fig. 5, the valve body 66 includes the two passages 67 and 68 and when the valve body is positioned as shown in Fig. 5, conduit 52 communicates with conduit 33 and conduit 36 communicates with conduit 53.

When the valves are positioned as shown in Figs. 4, 5 and 6, liquid is pumped from the reservoir 31 by pump 26 through conduit 33, through the passage 67 in valve 34 and thence through line 52 through passage 55 in the 3-way valve 47 and thence the liquid passes through line 50 to the left hand end of the cylinder 90 of entirety 43 for relative movement of the piston therein. The liquid in the right hand portion of the cylinder 90 of entirety 43 thereupon is forced outwardly from the cylinder 90 of entirety 43 through conduit 51 and through passage 57 in valve 49 and thence through conduit 53 into passage 68 in the 4-way valve and thence through conduit 36 back to the reservoir which completes the cycle. It will be noted, therefore, in this operation no liquid is supplied to or discharged from cylinder 70 of entirety 42 since ports 46 and port 48 of the two 3-way valves are closed by the respective valve bodies 54 and 56 of the valves 47 and 49, respectively.

With the valves 47 and 49 in the same position but with the 4-way valve—see Fig. 5—positioned so the handle 35 is in the position designated by numeral 35b, the port 33 will communicate with the port 53 through passage 67 and the port 36 will communicate with the port 52 through passage 68. With this communication in effect, the pump will supply liquid from the reservoir 31 through conduit 33 and through the 4-way valve and passage 67 to the conduit 53, and thence through the passage 57 to conduit 51 and to the right hand end of cylinder 90 of entirety 43. The liquid previously supplied to the left hand end of the cylinder is discharged by the resulting movement to the right of the piston in said cylinder and through the conduit 50, through passage 55 in valve 47 to the conduit 52 which discharges through the passage 68 in valve 34 to the return line 36 to the reservoir. This last described fluid flow represents the other half of the fluid cycle for operating the arbitrarily designated "horizontal" power means.

Without further detailed explanation other than that which follows, it is to be understood that the application of fluid to one end of cylinder 70 and its discharge from the other end may be similarly effected and vice versa, through proper manipulation of the 4-way valve shown in Fig. 5 but in order to effect operation of the vertical cylinder and piston structure 42, the member 65 is moved to the right into substantially the same position as the member 63 is shown in Fig. 4 and member 63 moves to the left into engagement with the member 69 which, in Fig. 1, is shown as the dash of the vehicle. The two controls for the 3-way valves, may, if desired, be replaced by an equivalent single operable member having two extreme operative positions and if desired, an intermediate neutral or cutoff position. However, the latter does not appear essential due to the fact that the 4-way valve may be neutrally positioned as indicated at 35a—see Fig. 5—and in this instance, no fluid will pass through either of the conduits 53 or 52 or in either direction.

As shown clearly in Fig. 4, and reference is now had to an introductory statement previously made, there may be provided additional cylinder and piston constructions, and herein a second arbitrarily designated "vertical" cylinder and piston construction is designated by the numeral 142 and is shown dotted in Fig. 4, and the same includes a conduit 146 also shown dotted, having free communication with conduit 46. The opposite end of structure 142 has free communication with conduit 48 by the branch conduit 148. Similarly, a second arbitrarily designated "horizontal" cylinder 143 may be provided having a conduit 150 at one end, freely communicating with conduit 50 and the opposite end of cylinder 142 includes a conduit 151 having free communication with conduit 51. These structures 142 and 143, since they are connected in parallel with structures 42 and 43, respectively, are operable in the same manner that structures 42 and 43 are operable, respectively, and may be applied to the other end of the vehicle. As stated, for simplicity of illustration, the invention herein disclosed, has been illustrated by way of example only, so that structures 42 and 43 are applied to but one end of the vehicle and to the rearward end thereof. These structures could be applied equally as well to the forward end of the vehicle. If tandem connected structures were employed, structures 142 and 143 would be applied to the forward end of the vehicle if structures 42 and 43 are applied to the rearward end thereof as shown herein.

It is again repeated that as long as the engine operates, the pump shown in Fig. 1 also operates. Whenever the 4-way valve is positioned to secure fluid power operation, the bypass 37—39 is closed and the bypass 37—38 is normally closed until such time as the system automatically is relieved due to excess pressure created by the stoppage of movement of the movable member in either of the two structures, 42 or 43. This increase in pressure occurs at the end of piston movement in the desired direction, whereupon, the continued pumpage is automatically discharged through the last mentioned automatic bypass (37—38) arrangement. It, therefore, will be understood that in order to park or unpark a vehicle, the engine must be operated for such purposes and also that such operation is independent of the power transmission system between the engine of the vehicle and the propelling or power driven wheels thereof. The result, therefore, is that the system herein disclosed, is not only simple, positive and foolproof but in addition thereto, it is capable of application as an accessory to a standard motor vehicle without material alteration of the latter.

Figure 3:
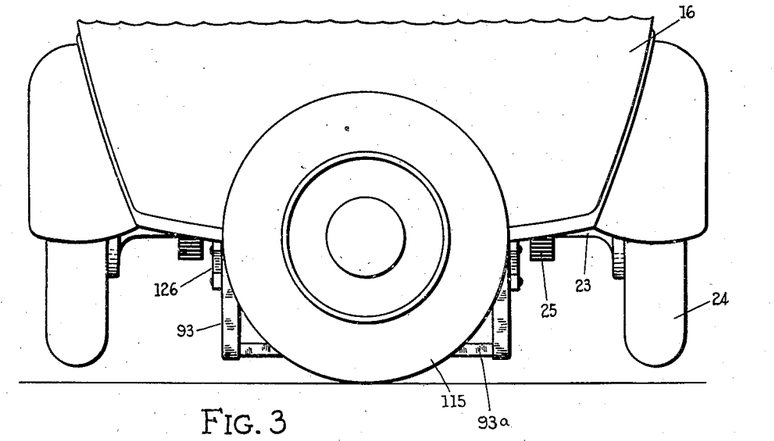
Fig. 3 is a view similar to Fig. 2 and of the same parts but with the vehicle elevated with reference to the roadway and supported by the parking device.
Figure 7:
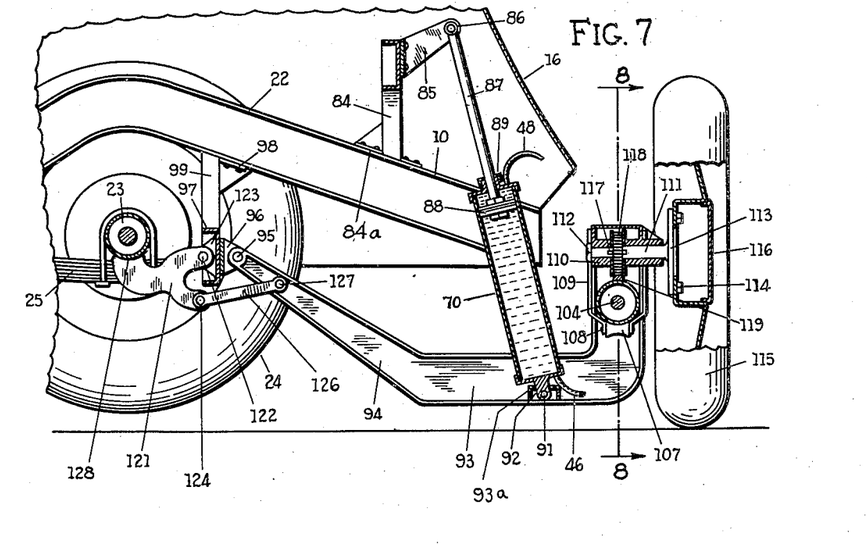
Fig. 7 is a side elevational view of the invention applied to the rear wheel system of a vehicle, the vehicle and the latter wheel system being shown in elevated relation with respect to the supporting roadway and with the parking device in the vehicle supporting position, portions of the device being shown in central section.

Reference will now be had more especially to Figs. 1 to 3, inclusive, and 7 to 9, inclusive, wherein by way of example, only one embodiment of the dual fluid operable parking device is illustrated. In said figures, in order that the terminology be consistent, there is illustrated in Fig. 7 a cylinder 70 and this is a representation of the cylinder of the entirety 42, shown in Fig. 4. Similarly, in Fig. 8, there is illustrated a cylinder 90 and this is the cylinder referred to as cylinder of the entirety 43 in Fig. 4. In Fig. 1 the remote control connection 62 is shown as a cable passing under pulley 71 mounted on the frame and over pulley 72 carried by support 73 mounted on the body member 74. Similarly remote control member 64 passes under pulley 75 and over pulley 76 also carried by the member 73.

The 4-way valve handle 35, see Fig. 1, is connected by a member 77 to a bell crank lever 78 as at 80 and the manually engageable portion 81 is positioned adjacent the steering wheel, the structure being supported by the bracket or base 82 carried by the steering column 83. Since the respective numerals as applied to Figs. 4 to 6, inclusive, have been applied to Fig. 1, the example illustrated, with the exceptions as noted hereinbefore, that the so-called vertical cylinder and piston structure has been designated by the numeral 70 in place of the entirety designating numeral 42 used in Fig. 4, and the horizontal cylinder and piston structure has been designated by numeral 90 in place of the entirety designating numeral 43 used in Fig. 4, no further detail reference to the system will follow, or is the same believed necessary. The following description relates solely to one embodiment of the invention, to-wit, the parking device per se specifically without reference to the control.

In the several figures, there is illustrated a support arrangement 84 suitably secured as at 84a to the frame 10 and it includes a rearward and upwardly projecting arm 85 to which is pivotally connected as at 86 one end of the piston rod 87 that mounts on its end and in the cylinder a piston 88. Cylinder 70—see Fig. 7—is closed by the cylinder head 89 of any desired leakproof character.

The opposite end of the cylinder 70 is pivotally supported as at 91 on a cross member 92 connecting the two arm portions 93, each of which has an angularly extending portion 94 which is pivotally supported at 95 on a bracket 96 carried by a cross member 97 suitably secured as at 98 through the depending side members 99 on the vehicle frame.

Figures 8, 9:
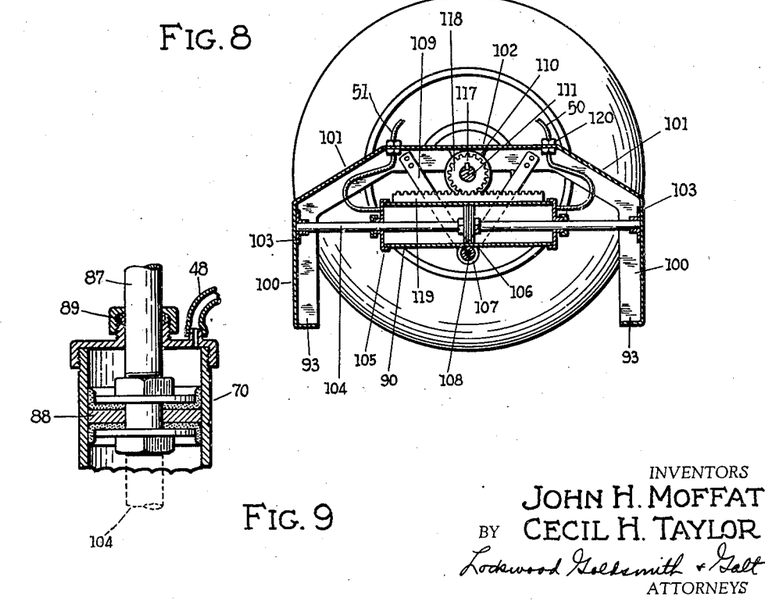
Fig. 8 is a transverse sectional view of the parking device taken on line 8—8 of Fig. 7 and in the direction of the arrows, with the parts shown in the neutral position.
Fig. 9 is an enlarged longitudinal sectional view of one end of a fluid cylinder with a piston therein, the dotted lines representing the transverse fluid moving arrangement, as will be more fully pointed out hereinafter.

Fig. 9 illustrates in detail by means of the full line construction, the cylinder and piston details. The two spaced portions 93 include upward extensions 100 at their rear ends and these extensions extend inwardly and upwardly as at 101 and are interconnected as at 102. Thus, portions 93, 94, 100, 101 and 102 constitute a bent U-shaped tiltably mounted frame pivotally mounted at its forward ends on the support carried by the vehicle frame or chassis.

Suitably supported by the parallel portions 100 are the piston rod supports 103 which support a stationary piston rod 104 that extends through the cylinder 90, before mentioned, having the cylinder heads 105 substantially similar to the cylinder head 89 shown in Fig. 8. In this instance, however, the piston rod, as shown, extends through opposite ends of the cylinder structure or through the cylinder heads and the dotted line, indicated by the numeral 104 in Fig. 8, represents this cylinder and piston structure. The cylinder, as stated, is slidably mounted on a piston rod and positioned therein is the piston 106. The cylinder is supported at its undersurface by a double conical roller or anti-friction element 107 supported on a pintle or shaft 108, the ends of which in turn are supported by the depending V-shaped support members 109 suitably secured to and depending from the cross connecting portion 102 of the U-shaped frame.

Also secured to the portion 102 is the bearing structure 110 which rotatably supports the shaft 111 operatively secured thereto by the nut 112 or equivalent means, and terminating in a plate 113 at its opposite end. The plate 113 has detachably secured to it, as by the elements 114, an intermediate or operative wheel 115 which may constitute the spare wheel when desired. In this instance, the same is illustrated as such and the hub cap 116 is also illustrated in Fig. 7.

Keyed as at 117 to the shaft 111 is a pinion 118 which is in constant mesh with the rack 119 rigid with the cylinder 90.

When fluid is supplied to cylinder 70 through conduit 46, the piston 88 is elevated therein which forces the U-shaped frame, before mentioned, downwardly with respect to the vehicle, thus causing the intermediate wheel 115 to engage the roadway and elevate the rear end of the vehicle. When it is desired to lower the vehicle so that wheels 24 may engage the roadway, fluid is supplied to cylinder 70, to conduit 48 and the fluid below the piston 88 is exhausted through the conduit 46. This describes the elevating and lowering cycle.

When it is desired to move the vehicle to the right or to the left, fluid is applied to either of the conduits 50 or 51—see Fig. 1—and the same bearing upon the stationary piston 106 causes the cylinder to move in the proper direction. At the same time, this movement forces the fluid from the other end of the cylinder back to the reservoir through the other conduit. The return movement is obtained by reversing the application of fluid. Also, the system is so arranged—see Fig. 8—that right hand or left hand movement may be the initial movement and the subsequent left hand or right hand movement respectively would be the return movement. As indicated at 120 the conduit connections to cylinder 90 are rigidly anchored to the U-shaped frame 93—94—100—101—102 for movement therewith. However, it is to be understood the conduit connections to each of the fluid operable cylinder and piston structures, are of flexible character.

Reference will now be had to Figs. 1 and 7. It will be quite apparent that after wheel 115 engages the roadway with wheels 24 also in engagement therewith, that subsequent relative movement between the U-shaped frame and the vehicle body by reason of the continued relative movement between the piston and cylinder 88 and 70 elevates the vehicle body, including the chassis from the roadway. However, due to the elasticity of the springs 25, the wheels 24 would normally continue in contact with the roadway without supporting any of the weight of the vehicle. In other words, when it is desired to move the vehicle laterally of its original position, the wheels 24 might, and in most instances would, drag across the roadway in said lateral movement.

To eliminate this wear and reduce the resistance to transverse movement occasioned by this contact, there is provided adjacent each spring a member 121 which is pivoted at 122 to a bracket 123 carried by the cross member 97 of the support 99. One arm of this lever 121 is pivotally connected as at 124 to a link 126 pivoted at 127 to the adjacent arm 94. The free end 128 of the lever 121 is arcuate in its formation and when moved from the position shown in Fig. 1 to the position shown in Fig. 7, it engages the bottom of the axle structure 23 and serves to load the spring 25 so as to maintain the wheel 24 in the same relative position to the frame 10 as it had when the wheel was supporting the vehicle. This loading is automatic in the lowering movement of the auxiliary U-shaped frame structure and the elevation of the vehicle.

When desired, there may be provided an open bottom trunk arrangement or hood 9—see Fig. 1a—into which the exposed portion of the auxiliary frame and the intermediate wheel may nest when in the inoperative position. This trunk or hood structure may have the opening 8 closed by a detachable closure 7 to permit removal of the intermediate wheel if of spare wheel character whenever it is desired to change wheels.

Figure 10:
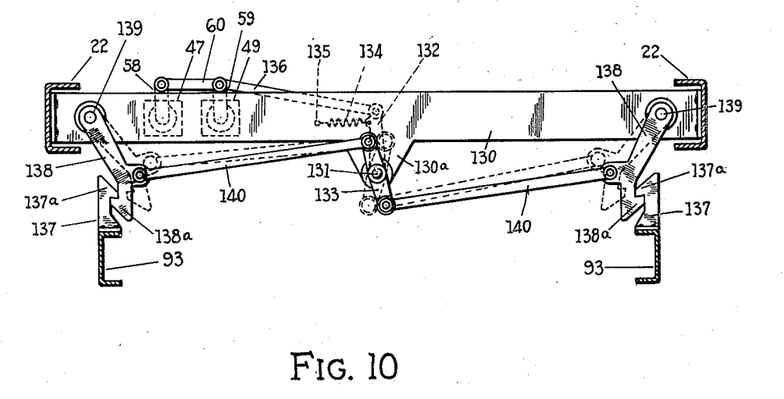
Fig. 10 is an elevational view of a portion of a modified form of a portion of the invention, to-wit, an automatic safety lock addition.
Figure 11:
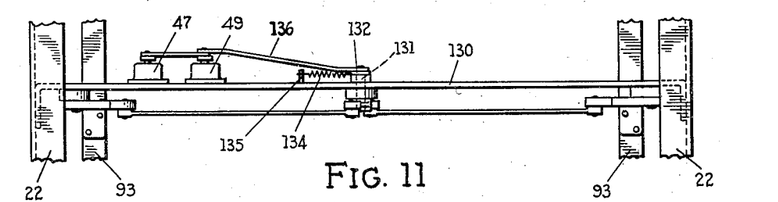
Fig. 11 is a plan view thereof.

In Figs. 10 and 11 is illustrated a portion of the invention with the safety lock arranged incorporated therein. Like numerals herein indicate like parts found in Figs. 1 to 9, inclusive.

Secured at opposite ends to the side portions 22 of frame 10 is a transverse member 130. If desired, valves 47 and 49, illustrated in Fig. 1 as mounted upon member 22 and having handle portions or arms 58 and 59, respectively, and connected by link 60, may be positioned in the hood compartment and directly controlled instead of being remotely controlled by cables 62 and 64 and members 63 and 65, respectively, as illustrated in Fig. 1.

Member 130 includes the extension 130a which rotatably supports rock shaft 131 which at opposite ends mounts lever arms 132 and 133. A spring 134 is connected at one end to anchorage 135 carried by member 130 and at its opposite end to lever arm 132. Link 136 connects lever arm 132 to link 60.

The auxiliary frame 93 includes at opposite sides the catch members 137. Latches 138 are pivoted at 139 on member 130. Latches 138 are connected by links 140 to opposite ends of lever arm 133. The latches have hook portions 138a and the catches 137 have cooperating portions 137a.

When link 136 is moved to the right simultaneously with valve operation, the latches are released to permit the auxiliary frame 93 to be lowered. Spring 134 normally tends to retain the latches in latching position and when the parts are positioned as shown in the full lines in Fig. 10, this spring prevents accidental release of the latches. The opposing faces of portions 137 and 138 are beveled for cam movement of the latches in the elevation of the auxiliary frame 93.

Figures 12, 13:
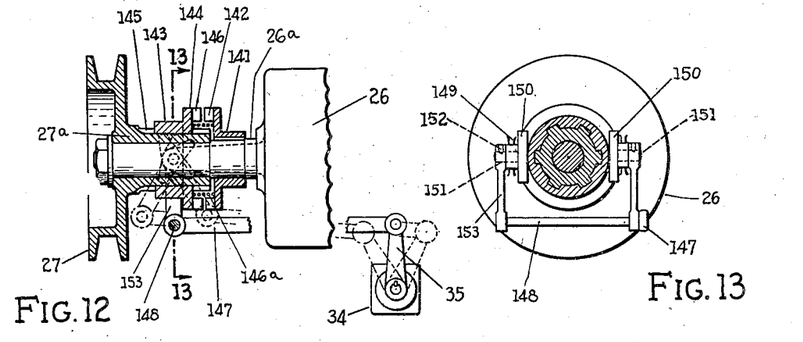
Fig. 12 is an elevational view of a portion of another modified form of a portion of the invention, to-wit, a clutch controlled drive for the pump.
Fig. 13 is a sectional view of the clutch controlled drive taken on line 13—13 of Fig. 12 and in the direction of the arrows.

In Figs. 12 and 13, like numerals indicate the like parts illustrated in Figs. 1 and 4. 27 indicates the pulley, 26 the pump and 34 the main control valve having operating arm 35 actuated by member 77. Fig. 1 illustrates the continuous drive arrangement. Figs. 12 and 13 illustrate a clutch control arrangement. Herein pump shaft 26a has keyed or splined to it a clutch structure 141 with a toothed arrangement 142.

Pulley 27 is rotatably mounted on shaft 26a. Clutch collar 143, having the annular face 144 is axially slidable on the hub 27a of the pulley 27. It is also splined thereto as at 145 so that the collar rotates with the pulley. It has teeth 146 for engagement with teeth 142. A spring 146a normally maintains the clutch faces disengaged.

The means for causing engagement includes a link 147 connected to arm 35 of valve 34 and to the transverse member 148. Projecting from the pump housing is a pair of spaced arms 149 which straddles the clutch structure. In each of the arm ends is pivotally mounted a cam 150 having the rock shaft portion 151. These are secured as at 152 to arms 153 connected to link 147 as shown.

When the main control valve is positioned in the neutral or cut off position, see 35a Fig. 5, the clutch collar is positioned so that it rotates free from tooth engagement and the pump is idle. When the main control valve is moved to either opposite control position, see 35 and 35b Fig. 5, the collar connects the pulley to the pump shaft and the pump is operated.

This type of pump power control reduces pump wear.

Figure 14:
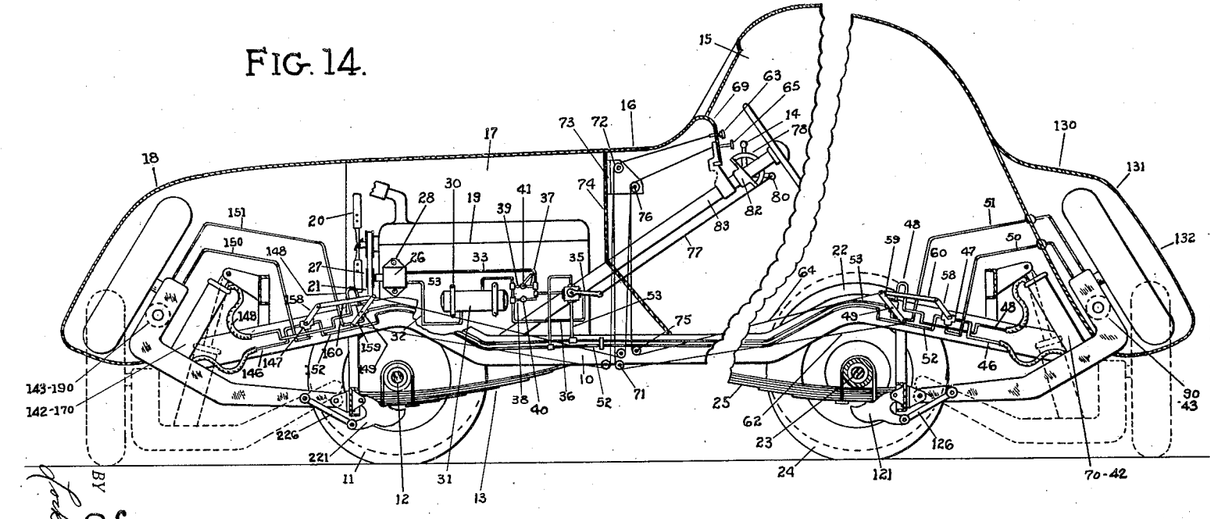
Fig. 14 is a view similar to Fig. 1 but illustrating the multiple form of the invention diagrammatically illustrated in Fig. 4 by dotted lines.

In Fig. 14 a dual form of the invention is illustrated which is similar to that shown in Fig. 1, but there is added thereto the forward parking device indicated diagrammatically in Fig. 4 by lines or conduits 151 and 150 and member 143 connected thereto and by conduits or lines 146 and 148 connected to member 142. Numerals increased by one hundred similar to the primary series numerals indicate other duplicated parts in the forward parking addition construction. No further description relative thereto is believed necessary.

While the invention has been described in great detail in the foregoing specification, the same is to be considered as illustrative and not restrictive in character. Various modifications have been illustrated herein and the same have been also described as well as others which appear self evident and such modifications, as well as others which will readily suggest themselves to persons skilled in this art, are all considered to be within the broad scope of this invention, reference being had to the appended claims.

The invention claimed is:

1. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of the original position of the supported portion and thereafter into the last mentioned original position, means connecting both fluid pressure operable means to the pump means for operation by the pump means, and manually operable control means for the last mentioned connecting means.

2. In a vehicle having an engine, a pair of axially aligned vehicle supporting wheels and intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, and manually operable control means for the connection means, the pump means comprising a single pump, the manually operable control means selectively connecting the same to either fluid operable means and disconnecting the other therefrom.

3. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, and manually operable control means for the connection means, each fluid operable means comprising a cylinder and a piston therein, the connecting means having connection with opposite ends of each cylinder.

4. In a parking device for vehicles including a parking wheel, the combination of a fluid operable piston and cylinder structure for positively raising and positively lowering the parking wheel, another fluid operable piston and cylinder structure for positively rotating said parking wheel in one direction and positively rotating the same in the opposite direction, a fluid reservoir, a pump communicating therewith, a pair of multiple positioned valves, one for each structure, connections between one end of each structure to one of the valves, connections between the other end of each structure to the other valve, a third valve, a connection between each first mentioned valve and the third valve, a connection between the third valve and pump, and another connection between the third valve and reservoir for the purpose described.

5. A device as defined by claim 4, characterized by a control for each valve, and means connecting the controls of the two first mentioned valves for conjoint operation, and selective positioning of the first mentioned valves.

6. A device as defined by claim 4, characterized by a valve controlled bypass around the third valve and between the last two mentioned connections.

7. A device as defined by claim 4, characterized by a valve controlled bypass around the third valve and between the last two mentioned connections, and automatically operable.

8. A device as defined by claim 4, characterized by a valve controlled bypass around the third valve and between the last two mentioned connections, and automatically operable by the increase of pressure in the pump to the third valve connection.

9. A device as defined by claim 4, characterized by a valve controlled bypass around the third valve and between the last two mentioned connections, and automatically operable in the operation of the third valve, the bypass and third valve operation being of differential character.

10. In a parking device for automobiles having a chassis, the combination of an automobile supporting wheel, a supporting frame therefor pivotally supported upon the vehicle chassis, a stationary piston rod on the supporting frame, a cylinder slidable thereon, a piston on the rod in the cylinder, a rack on the cylinder, a supporting shaft for the wheel and rotatably supported by the frame, a pinion on the shaft and meshing with the rack for wheel rotation in the movement of the cylinder on the rod for automobile traversing movement, and a second cylinder and piston connection between the chassis and frame for moving the wheel toward and away from the chassis in a general direction substantially transverse to the direction of wheel travel when rotated.

11. In a parking device for automobiles having a chassis, the combination of an automobile supporting wheel, a lever type frame therefor pivotally supported upon the vehicle chassis, a cylinder and piston connection between the chassis and frame, means for connecting either end of the cylinder to a source of fluid pressure for positively moving the wheel relative to the frame and in opposite directions, the chassis including a vehicle frame and a vehicle wheel axle traverse to the axis of the supporting wheel and movable relative to the vehicle frame, a lever pivotally supported relative to the vehicle frame and adjacent the axle, and a connection between the lever type frame and the last mentioned lever for movement of the latter into engagement with the axle and for disengagement therefrom in the movement of the lever type frame relative to the chassis.

12. In a parking device for automobiles having a chassis, the combination of an automobile supporting wheel, a supporting frame therefor pivotally supported upon the vehicle chassis, a stationary piston rod on the supporting frame, a cylinder slidable thereon, a piston on the rod in the cylinder, a rack on the cylinder, a supporting shaft for the wheel and rotatably supported by the frame, a pinion on the shaft and meshing with the rack for wheel rotation in the movement of the cylinder on the rod for automobile traversing movement, a second cylinder and piston connection between the chassis and frame for moving the wheel toward and away from the chassis in a general direction substantially traverse to the direction of wheel travel when rotated, the chassis including a vehicle frame and a vehicle wheel axle traverse to the axis of the supporting wheel and movable relative to the vehicle frame, a lever pivotally supported relative to the vehicle frame and adjacent the axle, and a connection between the lever type frame and the last mentioned lever for movement of the latter into engagement with the axle and for disengagement therefrom in the movement of the lever type frame relative to the chassis.

13. In a parking device for vehicles, including a parking wheel, the combination of a piston and cylinder structure for positively raising and positively lowering the parking wheel, another piston and cylinder structure for positively rotating said parking wheel in one direction substantially transverse to the raising and lowering direction and positively rotating the wheel in the opposite direction, a fluid reservoir, a pump communicating therewith, a pair of multiple positioned valves, one for each structure, connections between one end of each structure to one of the valves, connections between the other end of each structure to the other valve, a third valve, a connection between each first mentioned valve and the third valve, a connection between the third valve and pump, and another connection between the third valve and reservoir, a second parking wheel, and another piston and cylinder structure having parallel fluid connection with one of the foregoing piston and cylinder structures and simultaneously and similarly operable therewith for securing identical movement of the second parking wheel.

14. In a parking device for vehicles, including a parking wheel, the combination of a piston and cylinder structure for positively raising and positively lowering the parking wheel, another piston and cylinder structure for positively rotating said parking wheel in one direction substantially transverse to the raising and lowering direction and positively rotating the wheel in the opposite direction, a fluid reservoir, a pump communicating therewith, a pair of multiple positioned valves, one for each structure, connections between one end of each structure to one of the valves, connections between the other end of each structure to the other valve, a third valve, a connection between each first mentioned valve and the third valve, a connection between the third valve and pump, another connection between the third valve and reservoir, a second parking wheel, another piston and cylinder structure having parallel fluid connection with the raising and lowering piston and cylinder structure and simultaneously and similarly operable therewith for securing identical movement of the second parking wheel, and another cylinder and piston structure having parallel fluid connection with the rotating piston and cylinder structure for simultaneous and similar operation therewith for securing identical movement of the second parking wheel.

15. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, a clutch type drive between the engine and the pump means, and control means for the clutch portion thereof automatically operable in the operation of the manually operable means.

16. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered.

17. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered, said latch structure means including a camming arrangement for automatic latching of the intermediate wheel in elevated position upon attaining same.

18. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, the vehicle including a frame and a spring connection between the vehicle wheels and frame, spring loading means carried by the frame of the vehicle and automatically operable in the movement of the intermediate wheel into vehicle supporting position for retaining the supporting wheels in substantially the same relative position with respect to the remainder of the vehicle and automatically releasing the wheels from the loading means upon intermediate wheel movement into non-supporting position, a clutch type drive between the engine and the pump means, and control means for the clutch portion thereof automatically operable in the operation of the manually operable means.

19. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, the vehicle including a frame, and a spring connection between the vehicle wheels and frame, spring loading means carried by the frame of the vehicle and automatically operable in the movement of the intermediate wheel into vehicle supporting position for retaining the supporting wheels in substantially the same relative position with respect to the remainder of the vehicle and automatically releasing the wheels from the loading means upon intermediate wheel movement into non-supporting position, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered.

20. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, the vehicle including a frame, and a spring connection between the vehicle wheels and frame, spring loading means carried by the frame of the vehicle and automatically operable in the movement of the intermediate wheel into vehicle supporting position for retaining the supporting wheels in substantially the same relative position with respect to the remainder of the vehicle and automatically releasing the wheels from the loading means upon intermediate wheel movement into non-supporting position, a clutch type drive between the engine and the pump means, control means for the clutch portion thereof and automatically operable in the operation of the manually operable means, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered.

21. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, a clutch type drive between the engine and the pump means, control means for the clutch portion thereof automatically operable in the operation of the manually operable means, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered.

22. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, the vehicle including a frame, a spring connection between the vehicle wheels and frame, spring loading means carried by the frame of the vehicle and automatically operable in the movement of the intermediate wheel into vehicle supporting position for retaining the supporting wheels in substantially the same relative position with respect to the remainder of the vehicle and automatically releasing the wheels from the loading means upon intermediate wheel movement into non-supporting position, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered, said latch structure means including a camming arrangement for automatic latching of the intermediate wheel in elevated position upon attaining same.

23. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, the vehicle including a frame, a spring connection between the vehicle wheels and frame, spring loading means carried by the frame of the vehicle and automatically operable in the movement of the intermediate wheel into vehicle supporting position for retaining the supporting wheels in substantially the same relative position with respect to the remainder of the vehicle and automatically releasing the wheels from the loading means upon intermediate wheel movement into non-supporting position, a clutch type device between the engine and the pump means, control means for the clutch portion thereof and automatically operable in the operation of the manually operable means, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered, said latch structure means including a camming arrangement for automatic latching of the intermediate wheel in elevated position upon attaining same.

24. In a vehicle having an engine, a pair of axially aligned vehicle supporting wheels and an intermediate wheel normally in non-supporting position, the combination of pump means operable by the engine, fluid pressure operable means for positively moving the intermediate wheel into vehicle supporting position and therefrom into non-supporting position, other fluid pressure operable means for positively rotating the intermediate wheel when in vehicle supporting position for moving the intermediate wheel supported portion of the vehicle laterally of its original position and thereafter into the last mentioned original position, means connecting both fluid pressure operable means to the pump means for operation thereof, manually operable control means for the connection means, a clutch type device between the engine and the pump means, control means for the clutch portion thereof and automatically operable in the operation of the manually operable means, latch structure means between the intermediate wheel and the vehicle frame and normally arranged to retain the intermediate wheel in elevated position, and means automatically operable in the operation of the manual operable means to release the intermediate wheel from the latch structure means when the intermediate wheel is to be lowered, said latch structure means including a camming arrangement for automatic latching of the intermediate wheel in elevated position upon attaining same.

JOHN H. MOFFAT.
CECIL H. TAYLOR.